Aug. 26, 1947.  G. DEAKIN ET AL  2,426,181
APPARATUS FOR PHASE AND SYNCHRONISM CONTROL
Filed July 17, 1944
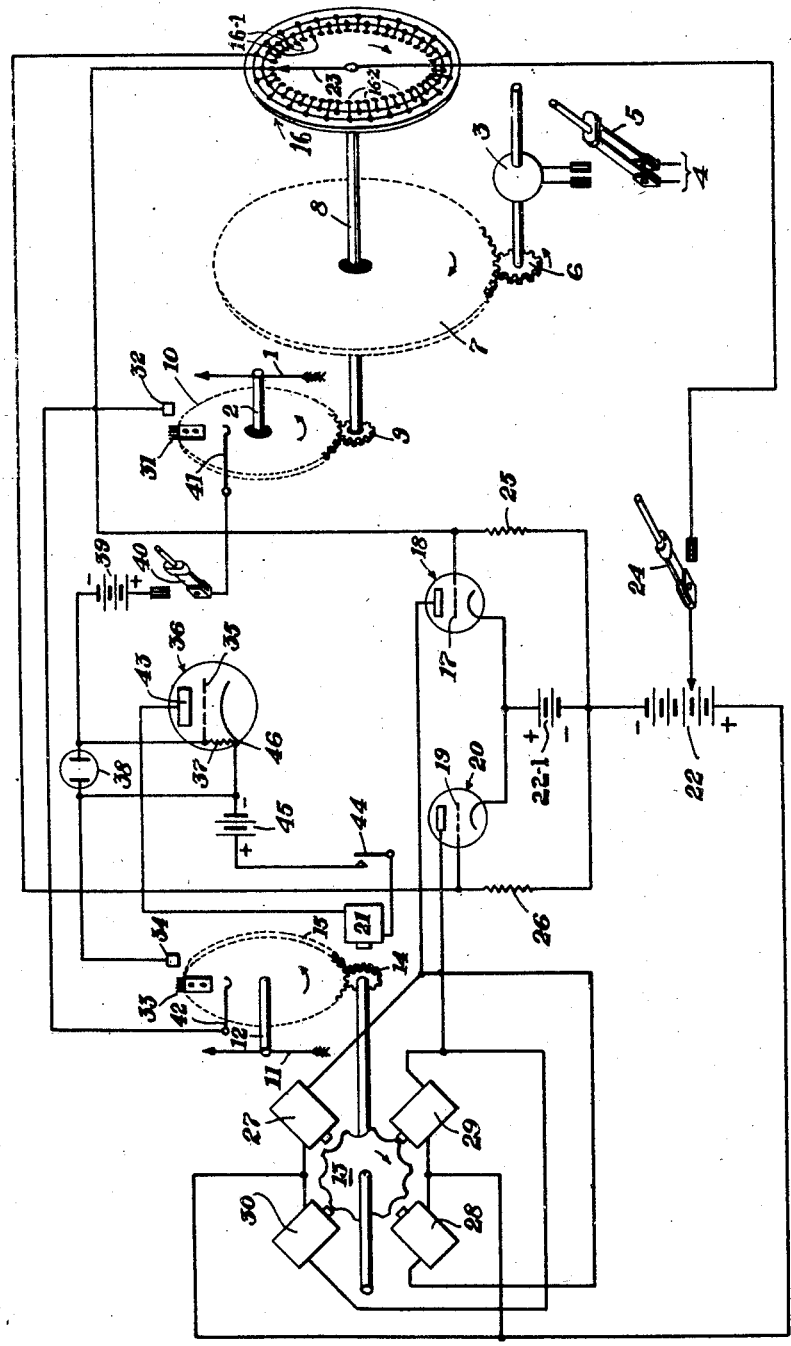
INVENTORS
GERALD DEAKIN
HENRY F. HERBIG
BY
Robert Harding Jr.
ATTORNEY Patented Aug. 26, 1947

2,426,181

UNITED STATES PATENT OFFICE 2,426,181

APPARATUS FOR PHASE AND SYNCHRONISM CONTROL

Gerald Deakin, New York, N. Y., and Henry F. Herbig, Madison, N. J., assignors to International Standard Electric Corporation, New York, N. Y., a corporation of Delaware Application July 17, 1944, Serial No. 545,332

20 Claims. (Cl. 172—293)

1

This invention relates to phase and synchronism control.

A principal object of the invention is to provide an apparatus for maintaining a rotary shaft in synchronism with another rotary shaft.

Another object of the invention is to provide a method and apparatus for starting the rotation of a shaft in synchronism and in phase alignment with another continuously rotating shaft.

Still another object of the invention is to provide an apparatus for indicating when a rotating shaft is in synchronism with another rotating shaft and has the same phase relation thereto.

Still another object of the invention is to provide an indicating mechanism including a rotatable pointer arranged to rotate in synchronism with an element mounted on a shaft at a distant point, to maintain the same phase angle therewith, and to indicate that the desired phase angle is being maintained.

This invention is illustrated in the accompanying drawing, in which the single figure is a schematic diagram showing the circuit and apparatus in one form of the invention.

In general, the invention makes use of a synchronous motor or phonic wheel at the controlled end of the system that follows pulses from commutator segments at the remote, controlling end, the commutator being driven by a non-synchronous motor which continuously drives the shaft at the controlling end. In the example chosen to illustrate the invention, this shaft is geared to the non-synchronous motor in a manner to rotate at a much slower speed than the motor. The synchronous motor or phonic wheel runs at a much slower speed than the non-synchronous motor. It is geared to the controlled shaft in such a manner that the latter runs at the same speed as the driven shaft at the remote end. Provision is made with pass by contacts on wheels attached to the two shafts in such a manner that one may be started in phase with the other and will remain in phase and flash a lamp as long as the apparatus is functioning correctly.

Referring to the drawing, pointer 1, representing any element arranged to be continuously rotated, is operatively connected to shaft 2 and can be rotated under the control of motor 3 by means of suitable energizing current from line 4 when switch 5 is closed. Shaft 2 runs at a much slower speed than motor 3, the reduction in speed being effected by a gear train comprising pinion gear 6 carried by the motor shaft and meshing with a gear 7 carried by an auxiliary

2 shaft 8 which also carries a pinion gear 9 which meshes with a gear 10 mounted on the shaft 2.

At the controlled end it is desired to control pointer 11 attached to shaft 12 in synchronism and in phase with pointer 1. Pointer 11 attached to shaft 12 is under the control of synchronous motor or phonic wheel 13 through suitable reduction gears 14 and 15 and a clutch, mechanism to be later described.

Motor 13 is maintained in synchronism with shaft 8 by means of commutator device 16 which is operated by that shaft. The odd segments 16—1 of the commutator are connected to the grid 17 of thermionic tube 18 and the even segments 16—2 are connected to the grid 19 of thermionic tube 20.

Gear 14 meshes with gear 15 under control of clutch magnet 21 and is arranged so that the gears engage when clutch magnet 21 is de-energized. Current from battery 22 is fed to brush 23 of the commutator device 16 by way of switch 24 and thence through either of resistances 25 or 26, depending on the position of brush 23, to the negative side of battery 22. The grids 17 and 19 are normally biased negative by a battery 22—1 so that no current flows in the plate circuits. However, when switch 24 is closed, brush 23 alternately engages segments 16—1 and 16—2 and the positive potential of battery 22 is connected to the respective grids 17 and 19. Thus, the voltage drop across resistance 25 is applied as a positive potential to grid 17 of tube 18 with the result that current flows through the plate circuit of tube 18; similarly the voltage drop across resistance 26 is applied as a positive potential to grid 19 of tube 20 with the result that current then flows through tube 20. The plate circuit of tube 18 includes oppositely positioned field magnets 27 and 28 of motor 13 in parallel and battery 22, while the plate circuit of tube 20 includes field magnets 29 and 30 in parallel and battery 22.

Brush 31 on gear 10 and fixed conducting segment 32, brush 33 on gear 15 and fixed conducting segment 34 are for the purpose of starting pointer 11 in phase with pointer 1 while the latter is being rotated.

Grid 35 of tube 36 is normally maintained at cathode potential. However, the grid circuit includes resistor 37 which is connected in parallel with a neon lamp 38. This parallel connection of resistor 37 and neon lamp 38 is connected in a circuit including battery 39, switch 40, brush 41, gear 10, brush 31, segment 32, brush 42, gear 15, brush 33, and segment 34. Whenever the switch 40 is closed and the brushes 31 and 33 are simultaneously engaging the segments 32 and 34, current from the battery 39 will pass through the resistor 37 and neon lamp 38, producing a voltage drop which will be applied to the grid 35, thus making the grid 35 more negative.

The clutch mechanism 21 is of the magnetic type and is arranged in a known manner to connect and disconnect the gears 14 and 15, the gears being in mesh when the magnetic clutch is de-energized and out of mesh when the clutch is energized. This is for the purpose of eliminating current drain during the normal running time. The magnetic clutch is connected to the plate 43 of the tube 36 and includes a front contact 44 adapted to be closed for the energization of the clutch mechanism and a battery 45, the negative side of which is connected to the cathode 46 of the tube 36. The contact 44 is adapted to be closed manually in order to energize the clutch mechanism and thus disassociate the gears 14 and 15 providing the grid 35 of the tube 36 is at a potential near the cathode 46. By driving the grid 35 negative, the plate-cathode current of the tube 36 is shut off thus de-energizing clutch 21 which causes gears 14 and 15 to mesh again so that motor 13 can drive shaft 12 and pointer 11. When clutch 21 is de-energized front contact 44 automatically opens and will not close again until it is closed manually.

Referring now to the operation of the circuit and assuming that switches 5, 24 and 40 are open, the non-synchronous motor 3 may be started by closing switch 5 which connects the motor with the source of energizing current from the line indicated at 4. This rotates the shaft 2 and pointer 1 through the gear train 6, 7, 9 and 10. After motor 3 has reached the normal speed, which, in the example chosen for illustration, may be about 1200 R. P. M., synchronous motor or phonic wheel 13 is ready to be started.

Contact 44 on clutch 21 is now closed manually, thus closing the circuit through the clutch magnet, battery 45, vacuum tube 36, between the cathode 46 and plate 43 thereof, the grid and cathode under this condition being at substantially the same potential. This holds clutch 21 in an inoperative or released condition and the gearing between motor 13 and controlled shaft 12 disconnected. Shaft 12 and its associated disc 15 are then set manually so that brush 33 is resting on contact 34.

Motor 13 is now started by spinning it electrically or manually by any of the well known methods (not shown) and is thus brought up to approximately its normal speed or a little greater, at which time switch 24 is closed. The closing of switch 24 has the effect of swinging the grids 17 and 19 of tubes 18 and 20 alternately positive as the brush 23 of the commutator device 16 rotates over the segments. The odd segments 16—1 are connected to grid 17 of tube 18 and the even segments 16—2 are connected to grid 19 of tube 20. When brush 23 is contacting an odd segment 16—1, as shown in the drawings, grid 17 becomes positive with respect to the cathode of tube 18 and the tube becomes conducting, causing current to flow through field magnets 27 and 28 back to battery 22. This causes the armature to move so that pole pieces which form armature poles move opposite field coils 27 and 28. When brush 23 moves to an even commutator segment 16—2, grid 19 of tube 20 becomes positive with respect to the cathode and tube 20 become conducting, so that coils 29 and 30 of motor 13 are now energized and attract armature poles thus rotating the armature so that the poles appear opposite coils 29 and 30. This causes motor 13 to fall into step with the pulses produced by commutator device 16 and to be driven at a constant speed with respect thereto.

Switch 40 is now closed. Thereupon the next time brush 31 passes over contact 32, a circuit is obtained through battery 39, switch 40, brush 41, gear 10, brush 31, contact 32, brush 42, gear 15, brush 33, contact 34, and neon lamp 38 in parallel with grid resistance 37 back to battery 39. The negative side of battery 39 is connected to grid 35 and the positive side is now connected to the cathode 46. This breaks the circuit between the cathode 46 and plate 43 because the potential drop across the resistor 37 produces a high negative potential on grid 35 in relation to the cathode 46. This causes clutch 21 to release and open its contact 44, allowing gear 14 to engage gear 15 and start the indicating device 11 in phase with pointer 1. Pointer 11 will then rotate in synchronism with pointer 1 driven by motor 13.

As long as pointer 11 is in phase with pointer 1 neon lamp 38 will flash each time the pointers rotate as brushes 31 and 33 simultaneously engaged contacts 32 and 34. The flashing of the lamp is thus an indication that pointer 11 is in phase with pointer 1. If for any reason pointer 11 gets out of phase with pointer 1, the brushes will no longer engage the contacts simultaneously and therefore the neon lamp will not light. If the neon lamp ceases to flash, therefore, indicating an out-of-phase relation, it is only necessary to open switch 40 and close contact 44 which will operate clutch 21 to disconnect gears 14 and 15. Pointer 11 may then be set at the position where brush 33 engages contact 34 and switch 40 closed again. This will cause the tube 36 to shut off, as already described, when pointer 1 is in angular alignment with pointer 11 and brush 31 is in engagement with contact 32. The circuit through the clutch mechanism is thus again broken with the result that gears 14 and 15 mesh with each other at this instant to cause pointer 11 to start in angular alignment with pointer 1.

Pointer 1 may be designed to operate at any suitable speed as determined by the gear connection to motor 13. In the arrangement shown in the drawings for illustrative purposes pointer 1 is arranged to rotate at about 4 rotations per minute. The normal speed of motor 13 is determined by the number of poles provided in the armature, the number of segments on the commutator 16, and the speed of the shaft 8 carrying the brush 23. If eight poles are provided on the armature of motor 13 and there are 48 segments, motor 13 will rotate at 180 R. P. M., if brush 23 is rotating at 30 R. P. M. If motor 13 has ten poles, it will rotate at 144 R. P. M. The gearing between motor 13 and pointer 11 and between shaft 8 and pointer 1 is so designed that the two pointers will operate in synchronism for a particular arrangement of armature poles and commutator segments.

It would be possible to connect the alternate commutator segments to the field coils of motor 13 directly without the use of tubes and have an operative structure. However, the discharge from the field coils in time would injure the commutator contacts, whereas the circuit as shown has no effect on the tubes and the energizing of the grids from the commutator has no appreciable effect on the commutator. It is quite probable that tube 36 could be replaced by a high speed relay. However, the tube has the advantage of speed and the minimizing of wear on the synchronizing contacts 32 and 34 due to the arcing that would occur without a relay if used directly in the series circuit.

Various modifications of the invention will be apparent to one skilled in the art and I do not therefore desire to limit myself to the specific structure shown in the drawing except as limited by appended claims.

What is claimed is:

1. Synchronous control apparatus comprising a phonic wheel, a plurality of electromagnets arranged in spaced relation around the circumference thereof, a first thermionic tube, means to connect alternate electromagnets in the plate-cathode circuit of said first thermionic tube, a second thermionic tube, means to connect the remaining electromagnets in the plate circuit of said second thermionic tube, a driven shaft, a commutator having a plurality of segments and a moving contact therefor attached to said shaft, means to connect alternate segments of said commutator to the grid of said first thermionic tube, means to connect the remaining segments of said commutator to the grid of said second thermionic tube, and means to connect the moving arm of said commutator to a source of potential more positive than the cathodes of said thermionic tubes, whereby said tubes are alternately operated as said shaft is rotated.

2. Apparatus of the class described comprising a first shaft, means continuously to rotate said first shaft, motor means, means associated with said shaft to rotate said motor means in synchronism with said first shaft, a second shaft, a clutch mechanism between said second shaft and said motor means, trigger means to hold said clutch mechanism in released position, a circuit, means to close said circuit only when said first and said second shafts are in the same phase relation, and means to release said trigger means when said circuit is closed to cause said clutch mechanism to operate, thus operatively connecting said second shaft and said motor means.

3. Apparatus in accordance with claim 2, in which said circuit includes an indicating device.

4. Apparatus in accordance with claim 2, in which the trigger means to hold the clutch mechanism in released position comprises a relay having a locking circuit which may be manually operated and is held locked under control of the relay.

5. Apparatus in accordance with claim 2, in which the clutch mechanism is in a circuit including the plate-cathode circuit of a thermionic tube and in which the release of said clutch mechanism is effected by causing the grid of the tube to swing sufficiently negative to shut off the tube.

6. Apparatus of the class described comprising a first shaft, means continuously to rotate said first shaft, means associated with said first shaft for producing a series of pulses when said shaft is rotated, a second shaft, rotating means for said second shaft, means to cause said pulses to drive said rotating means at a speed in synchronism with the speed of said first shaft, a second shaft, clutch mechanism between said second shaft and said rotating means, trigger means to hold said clutch in released position, a first brush carried by said first shaft, a first contact adapted to be engaged by said brush when said first shaft is in a predetermined angular position, a second brush carried by said second shaft, a second contact adapted to be engaged by said second brush when said second shaft is in a predetermined angular position, a circuit including said contacts and brushes, and means associated with said circuit to release said trigger means and cause said clutch mechanism to connect said second shaft to said rotating means when said circuit is closed by said brushes simultaneously engaging said contacts.

7. Apparatus in accordance with claim 6, in which said circuit includes an indicating device.

8. Apparatus in accordance with claim 6, in which said circuit includes a lamp which will light when the contacts are simultaneously engaged by the brushes.

9. Apparatus in accordance with claim 6, in which the clutch mechanism is held in released position by means of the plate-cathode current of a thermionic tube and means is provided to produce a potential on the grid of said tube more negative than the cathode when the circuit including said contacts and brushes is closed.

10. Apparatus of the class described comprising a first shaft, means continuously to rotate said shaft, means to produce a series of pulses when said shaft is rotated, a rotatable member, means to rotate said rotatable member in synchronism with said first shaft under control of said pulses, a second shaft, a clutch mechanism connected between said second shaft and said rotatable member, a relay for controlling said clutch mechanism having a first contact, a thermionic tube, a circuit for energizing said relay including the plate-cathode circuit of said thermionic tube and said first contact of said relay, and means to shut off said thermionic tube when said first and second shafts are in the same angular position, so as to release said relay and cause said clutch mechanism to connect said second shaft with said rotatable member.

11. Apparatus in accordance with claim 10, in which the means to shut off the thermionic tube comprises a circuit including two brushes one attached to each shaft and two contacts adapted to be engaged by the brushes simultaneously when the shafts are in the same angular position.

12. Apparatus in accordance with claim 10, including an indicating means and means to operate it when said thermionic tube is shut off.

13. Apparatus of the class described comprising, first and second rotatable means, means to rotate said first and second rotatable means in synchronous relationship including a releasable clutch through which said second rotatable means is driven, means to disengage said clutch whereby said second rotatable means may be set to a predetermined angular position, and means to engage said clutch when said first rotatable means is in a corresponding angular position, whereby said first and second rotatable means are rotated synchronously in corresponding angular positions.

14. In apparatus of the character described, the combination of, means at a first station to produce a series of electrical impulses at a speed determined by the speed of rotation of a first rotatable means, a second rotatable means at a second station, motive means at said second station and controlled by said electrical impulses to drive said second rotatable means at a speed dependent upon the speed of rotation of said first rotatable means, a releasable clutch mechanism connecting said second rotatable means to be driven by said motive means, electrically operable means to disengage said clutch mechanism whereby said second rotatable means may be given a predetermined angular position, and control means responsive to said first rotatable means reaching a predetermined angular position to engage said clutch mechanism whereby said second rotatable means is driven by said motive means.

15. In apparatus as described in claim 14 wherein said control means includes an electrical circuit which is completed by the closing of two switches one of which is positioned at said first station and the other of which is positioned at said second station and each of which is closed when its respective rotatable means is positioned in the said predetermined angular position.

16. Apparatus as described in claim 14 wherein said control means includes an electromagnet which is energized to release the clutch mechanism, and circuit means to supply power to said electromagnet including an electronic device having a controlled circuit through which current flows to said electromagnet and a control electrode which is normally biased to permit the flow of current through said control circuit and which is biased to prevent the flow of current when the two rotatable means are in their respective predetermined angular positions.

17. Apparatus as described in claim 14 wherein said motive means is driven by power supplied through electronic means which has control electrode means upon which said electrical impulses are impressed to exert the control effect.

18. Apparatus as described in claim 14 wherein said control means includes a circuit having a pair of switches positioned respectively to be opened and closed simultaneously by said first and second rotatable means when said first and second rotatable means are positioned in predetermined angular relationship, and an electronic device having a control grid and biasing impedance means with the biasing impedance means connected in series with a source of potential in said circuit whereby the closing of said switches produces a predetermined bias on said control electrode.

19. In apparatus of the character described, the combination of, a commutator device having a plurality of equally spaced segments and a moving contactor which engages said segments serially thereby to complete electrical circuits therethrough, means to rotate said moving contactor of the commutator device, an electric motor comprising two sets of electromagnets each set of which is formed by a plurality of electromagnets with the electromagnets of the two sets being positioned alternately around an annular magnetic zone and an armature having a plurality of spaced pole pieces rotatably mounted to move around said magnetic zone and to pass said electromagnets in succession, a pair of electronic devices associated respectively with said sets of electromagnets and each having a controlled circuit through which current flows to said electromagnets and each having a control electrode, means constituting a source of power connected to said electronic devices, and circuit means connecting alternate segments of said commutator device to one of the control electrodes and connecting the other segments to the other control electrode, whereby the rotation of said moving contactor causes said control electrodes to be biased alternately with the result that current flows to one set of said electromagnets and then the other and said sets of electromagnets all alternately energized so that said armature is rotated.

20. In the art of starting a first rotatable means rotating in synchronism with a second rotatable means, the steps of, producing a series of electrical impulses in accordance with the speed of rotation of said second rotatable means, producing rotation under the control of said impulses whereby the rotation is at the same relative speed as said second rotatable means, imparting to said first rotatable means a predetermined angular relationship, and connecting first rotatable means to be rotated by said rotation when said second rotatable means reaches an angular position corresponding to said predetermined angular position of said first rotatable means.

GERALD DEAKIN.
HENRY F. HERBIG.

REFERENCES CITED

The following references are of record in the file of this patent:

UNITED STATES PATENTS

| Number | Name | Date |
|---|---|---|
| 1,292,048 | Rainey | Jan. 21, 1919 |
| 1,866,275 | Stoller et al. | July 5, 1932 |